United States Patent [19]
Davis et al.

[11] Patent Number: 5,532,085
[45] Date of Patent: Jul. 2, 1996

[54] ADDITIVES FOR ALKALINE ELECTROCHEMICAL CELLS HAVING MANGANESE DIOXIDE CATHODES

[75] Inventors: Stuart M. Davis, Norfolk; Christopher P. Haines, Westford; Alexander A. Leef, Waltham, all of Mass.; Peter R. Moses, Windham, N.H.

[73] Assignee: Duracell Inc., Bethel, Conn.

[21] Appl. No.: 518,120

[22] Filed: Aug. 22, 1995

[51] Int. Cl.$^6$ .............................. H01M 4/50; H01M 4/42
[52] U.S. Cl. .................... 429/224; 429/229; 429/206
[58] Field of Search ................................. 429/206, 224, 429/229, 218

Primary Examiner—Prince Willis, Jr.
Assistant Examiner—Richard H. Lilley, Jr.
Attorney, Agent, or Firm—Ronald S. Cornell; Barry D. Josephs; Robert J. Feltovic

[57] ABSTRACT

The invention relates to alkaline cells containing manganese dioxide cathode active material. A substance selected from the group of compounds $CaWO_4$, $MgTiO_3$, $BaTiO_3$, $CaTiO_3$, $ZnMn_2O_4$, and $Bi_{12}TiO_{20}$ is added to the cathode of conventional alkaline cells typically having an anode comprising zinc and cathode comprising manganese dioxide and an alkaline electrolyte. The additive increases the service life of the cell.

14 Claims, No Drawings

1

ADDITIVES FOR ALKALINE ELECTROCHEMICAL CELLS HAVING MANGANESE DIOXIDE CATHODES

The invention relates to alkaline electrochemical cells with manganese dioxide cathode and compounds selected from the group $CaWO_4$, $MgTiO_3$, $BaTiO_3$, $CaTiO_3$, $ZnMn_2O_4$, and $Bi_{12}TiO_{20}$, and combinations thereof added to the cathode material to improve the performance of the cells.

Primary alkaline cells typically contain zinc anode active material, alkaline electrolyte, a manganese dioxide cathode active material, and an electrolyte permeable separator film, typically of cellulosic and synthetic fibers. Conventional alkaline cells may contain zero-added mercury such that the total mercury content is less than about 50 parts mercury per million parts by weight of total cell. The anode active material comprises zinc particles admixed with conventional gelling agents, such as sodium carboxymethylcellulose or the sodium salt of an acrylic acid copolymer, and electrolyte. The gelling agent holds the zinc particles in place and in contact with each other. A conductive metal nail, known as the anode current collector, is typically inserted into the anode active material. The alkaline electrolyte is typically an aqueous solution of potassium hydroxide, but other alkali solutions of sodium or lithium hydroxide may also be employed. The cathode material is typically of manganese dioxide and may include small amounts of carbon or graphite to increase conductivity. Conventional alkaline cells are encased in a steel container to retain the cell components and reduce the chance of leakage.

Since commercial cell sizes are fixed it has been desirable to attempt to enhance performance and/or useful service life of the cell by increasing the surface area of the electrode active material and by packing greater amounts of the active material into the cell. This approach has practical limitations, since if the active material is packed too densely into the cell this can reduce the rate of electrochemical reaction during discharge, in turn reducing service life. Other deleterious effects such as polarization can occur. Polarization limits the mobility of ions within the electrode active material and within the electrolyte, which in turn retards performance and service life. Thus, it is desirable to provide a way of retarding such deleterious effects which in turn can increase performance and/or useful service life of the cell.

It has been discovered that the addition of small amounts of specific compounds to the positive electrode of conventional zinc/$MnO_2$ alkaline cells can increase the service life of the cell. The compounds which have been found to increase the alkaline cell service life are: $CaWO_4$, $MgTiO_3$, $BaTiO_3$, $CaTiO_3$, $ZnMn_2O_4$, and $Bi_{12}TiO_{20}$, and combinations thereof. These compounds alone or in any combination may be added in admixture with the $MnO_2$ cathode material of a primary (non-rechargeable) alkaline cell so that their total weight comprises between about 0.1 to 5 percent by weight of the total cathode, preferably between about 0.3 and 3 percent by weight.

The following examples illustrate the invention and advantages derived therefrom. (All compositions are by weight unless otherwise specified.)

EXAMPLE 1 (COMPARATIVE EXAMPLE)

A conventional primary zinc/manganese dioxide alkaline cell (standard C cell), is prepared with conventional cathode and anode active material, electrolyte and separator membrane. The anode material may be in the form of a gelled mixture containing mercury free (zero-added mercury) zinc alloy powder. The total mercury content of the cell is thus less than 50 parts mercury per million parts cell weight. The anode mixture may typically contain zinc alloy powder, aqueous KOH solution, gelling agent, e.g. acrylic acid copolymer such as CARBOPOL C940 from B. F. Goodrich; and surfactants e.g. organic phosphate ester surfactant RM510 from Rhone Poulenc. The separator membrane can be a conventional electrolyte permeable membrane of polyvinyl alcohol/rayon material. The electrolyte is an aqueous solution of KOH containing about 40 wt % KOH and 2 wt % ZnO, hereinafter referred to as "aqueous KOH solution". The cathode active material in the standard cell has the following composition:

Electrolytic manganese dioxide (84 wt %), graphite (9.2 wt %), polyethylene powder binder (0.3 wt %) and a 7 Normal "aqueous KOH solution" (6.5 wt %).

Fresh standard cells are discharged to standard cut-off voltages on the basis of a continuous discharge test and intermittent discharge tests. The continuous discharge is carried out by discharging fresh standard cells at a constant load of 3.9 ohms to a cut-off of 0.75 volts (Test A). (The 3.9 ohms continuous drain corresponds to the American National Standard Institute (ANSI) toy test.) In a first intermittent discharge test (Test B) fresh cells are also discharged at a constant load of 3.9 ohms, but under the intermittent discharge conditions of the well known ANSI light industrial flashlight test (LIF). In the LIF test (Test B) the cells are discharged continuously for 4 minutes per hour during a period of 8 hours per day followed by a 16 hour rest period and then the cycle repeated to a cutoff voltage of 0.75 volts. In a second intermittent discharge test (Test C) the fresh cells are first stored for 2 weeks at 55° F. and then discharged for 1 hour per day at a constant load of 3.9 ohms to a cutoff voltage of 0.8 volts. (This corresponds to the International Electrotechnical Conference (IEC) toy test.) In each type of test the cell service life (hours) to cutoff voltage is recorded.

In addition the peak power of the fresh standard cells are determined by subjecting the cells to a pulse drain of 7 amps for 100 milliseconds. At this drain the peak power is calculated by multiplying 7 amps by the load voltage. The fresh standard cells exhibit a peak power of 6.2 watts.

EXAMPLE 2

Experimental zinc/$MnO_2$ size C alkaline cells identical to that referenced in Example 1 are prepared, except that in making the experimental cell an amount (gms) of $CaWO_4$ is added in admixture with the cathode so that the total cathode material comprises 1.5 percent by weight $CaWO_4$. The amount of $MnO_2$ in the cathode is reduced by an equal amount (gms) so that the total cathode weight in the experimental cell is the same as in the standard cell of Example 1. Thus, the cathode composition of the experimental cell in the present example is: Electrolytic manganese dioxide (82.5 wt %), $CaWO_4$ (1.5 wt %), graphite (9.2 wt %), polyethylene powder binder (0.3 wt %) and a 7 Normal "aqueous KOH solution" (6.5 wt %). The cells are discharged at a constant load of 3.9 ohms using the same continuous discharge test (Test A) and the same two intermittent discharge tests (Tests B and C) described in the comparative example (Example 1). The service life obtained in each of the three tests with the $CaWO_4$ additive is compared to that obtained in the corresponding test of comparative example (Example 1). The service life decreased 3.2% for Test A, increased 5.1% for Test B and increased 4.6% for Test C. These test results are summarized in Table 1.

The peak power of the fresh cells, determined as in Example 1, exhibits a 2.6% decrease over the peak power of the standard cells of Example 1.

EXAMPLE 3

Experimental zinc/MnO$_2$ size C alkaline cells identical to that referenced in Example 1 are prepared, except that in making the experimental cell an amount (gms) of MgTiO$_3$ is added in admixture with the cathode so that the total cathode material comprises 1.5 percent by weight MgTiO$_3$. The amount of MnO$_2$ in the cathode is reduced by an equal amount (gms) so that the total cathode weight in the experimental cell is the same as in the standard cell of Example 1. Thus, the cathode composition of the experimental cell in the present example is: Electrolytic manganese dioxide (82.5 wt %), MgTiO$_3$ (1.5 wt %), graphite (9.2 wt %), polyethylene powder binder (0.3 wt %) and a 7 Normal "aqueous KOH solution" (6.5 wt %). The cells are discharged at a constant load of 3.9 ohms using the same continuous discharge test (Test A) and the same two intermittent discharge tests (Tests B and C) described in the comparative example (Example 1). The service life obtained in each of the three tests with the MgTiO$_3$ additive is compared to that obtained in the corresponding test of comparative example (Example 1). The service life increased 5.1% for Test A, increased 0.9% for Test B and increased 3.7% for Test C. These test results are summarized in Table 1.

The peak power of the fresh cells, determined as in Example 1, exhibits a 0.1% decrease over the peak power of the standard cells of Example 1.

EXAMPLE 4

Experimental zinc/MnO$_2$ size C alkaline cells identical to that referenced in Example 1 are prepared, except that in making the experimental cell an amount (gms) of BaTiO$_3$ is added in admixture with the cathode so that the total cathode material comprises 1.5 percent by weight BaTiO$_3$. The amount of MnO$_2$ in the cathode is reduced by an equal amount (gms) so that the total cathode weight in the experimental cell is the same as in the standard cell of Example 1. Thus, the cathode composition of the experimental cell in the present example is: Electrolytic manganese dioxide (82.5 wt %), BaTiO$_3$ (1.5 wt %), graphite (9.2 wt %), polyethylene powder binder (0.3 wt %) and a 7 Normal "aqueous KOH solution" (6.5 wt %). The cells are discharged at a constant load of 3.9 ohms using the same continuous discharge test (Test A) and the same two intermittent discharge tests (Tests B and C) described in the comparative example (Example 1). The service life obtained in each of the three tests with the BaTiO$_3$ additive is compared to that obtained in the corresponding test of comparative example (Example 1). The service life increased 3.5% for Test A, increased 2.3% for Test B and increased 4.8% for Test C. These test results are summarized in Table 1.

The peak power of the fresh cells, determined as in Example 1, exhibits a 2.4% increase over the peak power of the standard cells of Example 1.

EXAMPLE 5

Experimental zinc/MnO$_2$ size C alkaline cells identical to that referenced in Example 1 are prepared, except that in making the experimental cell an amount (gms) of CaTiO$_3$ is added in admixture with the cathode so that the total cathode material comprises 1.5 percent by weight CaTiO$_3$. The amount of MnO$_2$ in the cathode is reduced by an equal amount (gms) so that the total cathode weight in the experimental cell is the same as in the standard cell of Example 1. Thus, the cathode composition of the experimental cell in the present example is: Electrolytic manganese dioxide (82.5 wt %), CaTiO$_3$ (1.5 wt %), graphite (9.2 wt %), polyethylene powder binder (0.3 wt %) and a 7 Normal "aqueous KOH solution" (6.5 wt %). The cells are discharged at a constant load of 3.9 ohms using the same continuous discharge test (Test A) and the same two intermittent discharge tests (Tests B and C) described in the comparative example (Example 1). The service life obtained in each of the three tests with the CaTiO$_3$ additive is compared to that obtained in the corresponding test of the comparative example (Example 1). The service life increased 6.8% for Test A, increased 3.5% for Test B and increased 5.0% for Test C. These test results are summarized in Table 1.

The peak power of the fresh cells, determined as in Example 1, exhibits a 9.6% increase over the peak power of the standard cells of Example 1.

EXAMPLE 6

Experimental zinc/MnO$_2$ size C alkaline cells identical to that referenced in Example 1 are prepared, except that in making the experimental cell an amount (gms) of ZnMn$_2$O$_4$ is added in admixture with the cathode so that the total cathode material comprises 1.5 percent by weight ZnMn$_2$O$_4$. The amount of MnO$_2$ in the cathode is reduced by an equal amount (gms) so that the total cathode weight in the experimental cell is the same as in the standard cell of Example 1. Thus, the cathode composition of the experimental cell in the present example is: Electrolytic manganese dioxide (82.5 wt %), ZnMn$_2$O$_4$ (1.5 wt %), graphite (9.2 wt %), polyethylene powder binder (0.3 wt %) and a 7 Normal "aqueous KOH solution" (6.5 wt %). The cells are discharged at a constant load of 3.9 ohms using the same continuous discharge test (Test A) and the same two intermittent discharge tests (Tests B and C) described in the comparative example (Example 1). The service life obtained in each of the three tests with the ZnMn$_2$O$_4$ additive is compared to that obtained in the corresponding test of the comparative example (Example 1). The service life increased 2.2% for Test A, increased 0.8% for Test B and increased 2.3% for Test C. These test results are summarized in Table 1.

The peak power of the fresh cells, determined as in Example 1, exhibit a 10.6% increase over the peak power of the standard cells of Example 1.

EXAMPLE 7

Experimental zinc/MnO$_2$ size C alkaline cells identical to that referenced in Example 1 are prepared, except that in making the experimental cell an amount (gms) of Bi$_{12}$TiO$_{20}$ is added in admixture with the cathode so that the total cathode material comprises 1.5 percent by weight Bi$_{12}$TiO$_{20}$. The amount of MnO$_2$ in the cathode is reduced by an equal amount (gms) so that the total cathode weight in the experimental cell is the same as in the standard cell of Example 1. Thus, the cathode composition of the experimental cell in the present example is: Electrolytic manganese dioxide (82.5 wt %), Bi$_{12}$TiO$_{20}$ (1.5 wt %), graphite (9.2 wt %), polyethylene powder binder (0.3 wt %) and a 7 Normal "aqueous KOH solution" (6.5 wt %). The cells are discharged at a constant load of 3.9 ohms using the same continuous discharge test (Test A) and the same two intermittent discharge tests (Tests B and C) described in the comparative example (Example 1). The service life obtained in each of the three tests with the $Bi_{12}TiO_{20}$ additive is compared to that obtained in the corresponding test of the comparative example (Example 1). The service life increased 8.1% for Test A, increased 3.9% for Test B and increased 3.6% for Test C. These test results are summarized in Table 1.

The peak power of the fresh cells, determined as in Example 1, exhibit a 10.3% increase over the peak power of the standard cells of Example 1.

In sum, each of the cathode additives described in the examples results in an improvement in service life of the alkaline cell as shown in Table 1.

TABLE 1

| | % Additive in Cathode | % Increase in Service Life @ 3.9 ohms | | | % Increase in Peak Power |
|---|---|---|---|---|---|
| | | Test A[1] | Test B[2] | Test C[3] | |
| $CaWO_4$ | 1.5 | −3.2 | +5.1 | +4.6 | −2.6 |
| $MgTiO_3$ | 1.5 | +5.1 | +0.9 | +3.7 | −0.1 |
| $BaTiO_3$ | 1.5 | +3.5 | +2.3 | +4.8 | +2.4 |
| $CaTiO_3$ | 1.5 | +6.8 | +3.5 | +5.0 | +9.6 |
| $ZnMn_2O_4$ | 1.5 | +2.2 | +0.8 | +2.3 | +10.6 |
| $Bi_{12}TiO_{20}$ | 1.5 | +8.1 | +3.9 | +3.6 | +10.3 |

Notes:
[1] Continuous discharge of fresh cells to 0.75 volts.
[2] Intermittent discharge (Light Industrial Flashlight Test) 4 minutes per hour for 8 hours followed by 16 hour rest and repeat cycle to cut-off voltage of 0.75 volts.
[3] Cells stored 2 weeks at 55° F. followed by intermittent discharge for 1 hour per day to cut-off voltage of 0.8 volts.

Additionally, the peak power improves in the case of addition of cathode additives $BaTiO_3$, $CaTiO_3$, $ZnMn_2O_4$ or $Bi_{12}TiO_{20}$. There is essentially no change in peak power when the $MgTiO_3$ additive is employed. The 2.6% decrease in peak power observed with the use of $CaWO_4$ cathode additive is more than offset by the significant increase in service life of the cell which can be realized when employing such compound.

Increase in service life of the zinc/$MnO_2$ primary (non-rechargeable) alkaline cell can also be obtained by mixing the above described additives in any combination and adding the combined mixture to the $MnO_2$ cathode during preparation of the cathode mix. The above additive or any combination thereof is advantageously added to the $MnO_2$ cathode of primary alkaline cells so that the total weight of the additive comprises between about 0.1 to 5 percent by weight of the total cathode, preferably between about 0.3 and 3 percent by weight.

Although the present invention was described with respect to specific embodiments, it should be recognized that variations are possible without departing from the concept of the invention. Thus, the invention is not intended to be limited to specific embodiments, but rather its scope is reflected by the claims and equivalents thereof.

What is claimed is:

1. An electrochemical cell comprising an anode, an aqueous alkaline electrolyte solution, a separator and a cathode comprising manganese dioxide, said cathode further comprising an additive selected from the group of compounds consisting of $CaWO_4$, $MgTiO_3$, $BaTiO_3$, $CaTiO_3$, $ZnMn_2O_4$, and $Bi_{12}TiO_{20}$, and combinations thereof.

2. An electrochemical cell comprising an anode, an aqueous alkaline electrolyte solution, a separator and a cathode comprising manganese dioxide, said cathode further comprising an additive selected from the group of compounds consisting of $MgTiO_3$, $BaTiO_3$, and $CaTiO_3$ and combinations thereof.

3. An electrochemical cell comprising an anode, an aqueous alkaline electrolyte solution, a separator and a cathode comprising manganese dioxide, said cathode further comprising $CaTiO_3$.

4. An electrochemical cell comprising an anode, an aqueous alkaline electrolyte solution, a separator and a cathode comprising manganese dioxide, said cathode further comprising $ZnMn_2O_4$.

5. An electrochemical cell comprising an anode, an aqueous alkaline electrolyte solution, a separator and a cathode comprising manganese dioxide, said cathode further comprising $Bi_{12}TiO_{20}$.

6. The electrochemical cell of claim 1 wherein said cell is a primary (non-rechargeable) alkaline cell having an anode comprising zinc.

7. The electrochemical cell of claim 2 wherein said cell is a primary (non-rechargeable) alkaline cell having an anode comprising zinc.

8. The electrochemical cell of claim 3 wherein said cell is a primary (non-rechargeable) alkaline cell having an anode comprising zinc.

9. The electrochemical cell of claim 4 wherein said cell is a primary (non-rechargeable) alkaline cell having an anode comprising zinc.

10. The electrochemical cell of claim 5 wherein said cell is a primary (non-rechargeable) alkaline cell having an anode comprising zinc.

11. The electrochemical cell of claim 1 wherein said additive comprises between about 0.1 and 5 percent by weight of the cathode.

12. The electrochemical cell of claim 1 wherein the aqueous electrolyte solution comprises potassium hydroxide.

13. The electrochemical cell of claim 1 wherein the total mercury content in the cell is less than 50 parts per million of total cell weight.

14. The cell of claim 1 wherein said additive has the effect of increasing the service life of the cell when the cell is discharged to about 0.8 volts with a load of 3.9 ohms.

* * * * *